United States Patent
Childress et al.

(10) Patent No.: US 7,586,839 B2
(45) Date of Patent: Sep. 8, 2009

(54) PEER TO PEER BACKUP AND RECOVERY

(75) Inventors: Rhonda L. Childress, Austin, TX (US); David Bruce Kumhyr, Austin, TX (US); Robert T. Madey, Jr., Austin, TX (US); Neil R. Pennell, Cedar Creek, TX (US)

(73) Assignee: Lenovo Singapore Pte. Ltd., Singapore (SG)

( * ) Notice: Subject to any disclaimer, the term of this patent is extended or adjusted under 35 U.S.C. 154(b) by 1018 days.

(21) Appl. No.: 11/014,563

(22) Filed: Dec. 16, 2004

(65) Prior Publication Data

US 2006/0136903 A1  Jun. 22, 2006

(51) Int. Cl.
*G01R 31/08* (2006.01)
(52) U.S. Cl. ............ 370/216; 370/226; 717/172
(58) Field of Classification Search ......... 370/200–253, 370/272–390, 431–546
See application file for complete search history.

(56) References Cited

U.S. PATENT DOCUMENTS

| | | | |
|---|---|---|---|
| 5,778,395 A * | 7/1998 | Whiting et al. | 707/204 |
| 6,065,037 A | 5/2000 | Hitz et al. | 709/200 |
| 6,941,947 B2 * | 9/2005 | Young et al. | 128/203.21 |
| 2002/0114341 A1 | 8/2002 | Sutherland et al. | 370/428 |
| 2003/0101235 A1 | 5/2003 | Zhang | 709/218 |
| 2003/0115251 A1 | 6/2003 | Fredrickson et al. | 709/201 |
| 2003/0145093 A1 | 7/2003 | Oren et al. | 709/229 |
| 2003/0158831 A1 | 8/2003 | Zaremba | 707/1 |
| 2003/0233455 A1 | 12/2003 | Leber et al. | 709/226 |
| 2004/0003272 A1 | 1/2004 | Bantz et al. | 713/193 |
| 2004/0034791 A1 | 2/2004 | Savathphoune | 713/200 |
| 2004/0153458 A1 | 8/2004 | Noble et al. | 707/10 |

* cited by examiner

*Primary Examiner*—Ricky Ngo
*Assistant Examiner*—Iqbal Zaidi
(74) *Attorney, Agent, or Firm*—Yee & Associates, P.C.; Carlos Munoz-Bustamante (57) ABSTRACT

A method in a processing system for managing backup data on a set of nodes in a network data processing system. An inventory of files is generated on a set of nodes in the network data processing system. An initial map from the inventory is created, wherein the first initial map includes an identification of each file located on a node in the set of nodes. A location map is built from the initial map and the location map identifies a set of files and identifies each node on which a file in the set of files is located, wherein at least one node in the set of nodes is a peer node to another node in the set of nodes.

22 Claims, 6 Drawing Sheets

PEER TO PEER BACKUP AND RECOVERY

CROSS REFERENCE TO RELATED APPLICATION

The present invention is related to an application entitled Rapid Provisioning of a Computer into a Homogenized Resource Pool, Ser. No. 11/014,562, filed even date hereof, assigned to the same assignee, and incorporated herein by reference.

BACKGROUND OF THE INVENTION

1. Technical Field

The present invention relates generally to an improved data processing system and in practically a method and apparatus for processing data. Still more particularly, the present invention relates to a method, apparatus and computer instructions for managing and restoring data.

2. Description of Related Art

Network data processing systems are widely used by businesses and other entities. These networks include, for example, local area networks (LANs) and wide area networks (WANs). A network data processing system may be located within a single floor or building. In other cases, a network data processing system may be found in several buildings or even in different cities or countries.

These network data processing systems are used for conducting business and performing other tasks within an entity. Network administrators and other information technology professionals maintain and expand network data processing systems. These administrators and professionals maintain backup systems for insuring redundancy of data within a network data processing system. Backup data may be stored on different media, such as tapes, disc drives, optical discs, or network attached devices. This backup data may be used to restore damaged or missing files on the network data processing system. In maintaining and expanding the network data processing system, new computers may be provisioned for use in the network data processing system or application may be provisioned onto computers. A computer is provisioned by installing the necessary files on the computer such that the computer may be used in the network data processing system. This provisioning may include, for example, setting up the entire computer including the operating system and applications or may involve installing a single application.

In backing up data to tape, the time needed to backup the data and restore the data is lengthy and may take a long amount of time as compared to other types of media. For example, disc drives provide a faster mechanism for backing up and restoring data. Both types of media require a large amount of storage space. These types of centralize storage systems include storage libraries and network attached storage systems. These types of systems are often expensive to purchase and maintain.

Therefore, it would be advantageous to have an improved method, apparatus, and computer instructions for backing up and restoring data in a network data processing system.

SUMMARY OF THE INVENTION

The present invention provides a method in a processing system for managing backup data on a set of nodes in a network data processing system. An inventory of files is generated on a set of nodes in the network data processing system. An initial map from the inventory is created, wherein the first initial map includes an identification of each file located on a node in the set of nodes. A location map is built from the initial map and the location map identifies a set of files and identifies each node on which a file in the set of files is located, wherein at least one node in the set of nodes is a peer node to another node in the set of nodes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
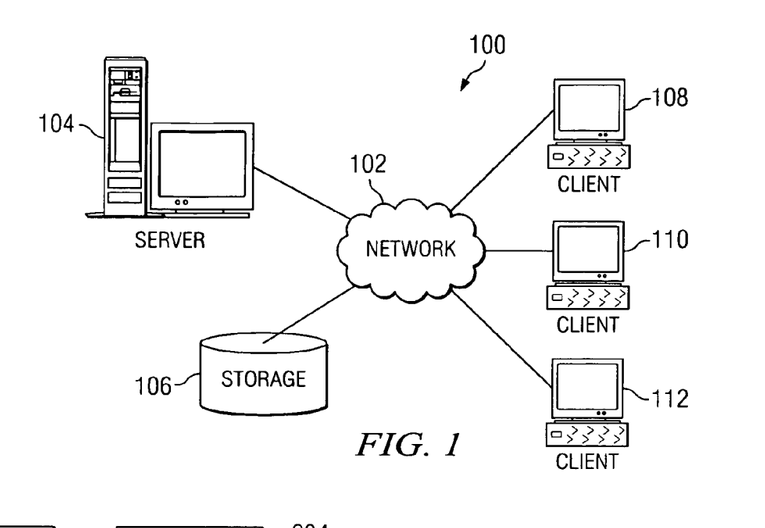
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). Network data processing system 100 may be setup as a peer-to-peer network in these examples. FIG. 1 is intended as an example, and not as an architectural limitation for the present invention.

Figure 2:
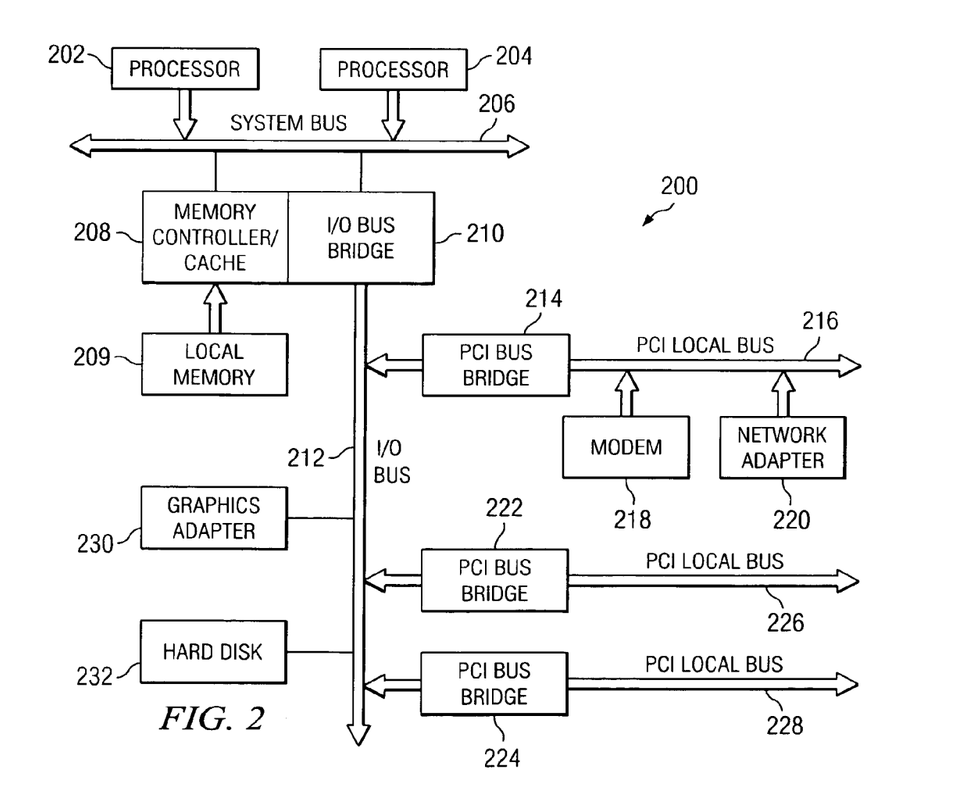
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
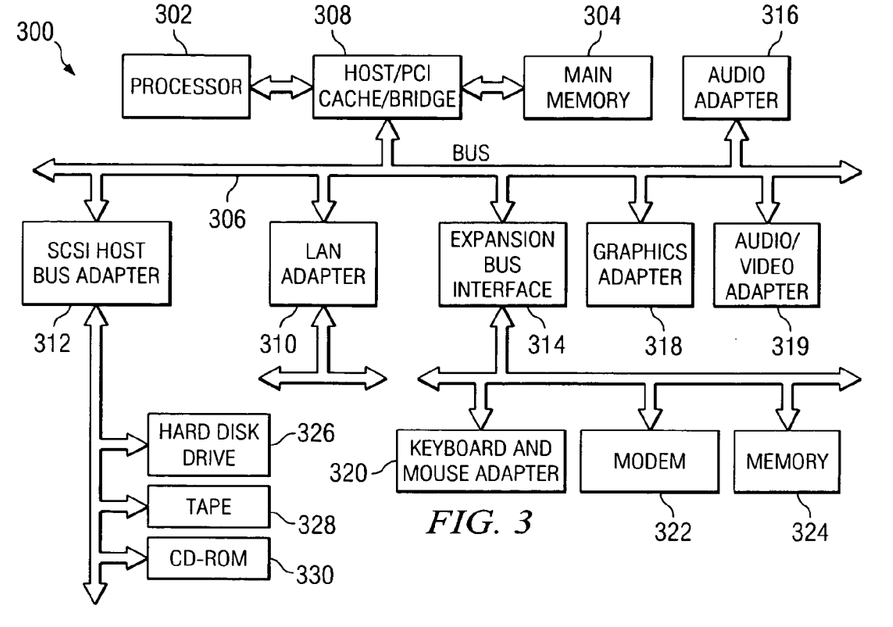
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for managing backup data. The mechanism provides an ability to efficiently backup and restore files in a network data processing system. The mechanism of the present invention identifies files on different nodes and generates an initial map. This map is converted into an index that is indexed by files in which each entry contains a location of the file on the network data processing system. This second map, which also is called a file map, is used in backing up and restoring files. This file map also may be referred to a location map.

Additionally, this file map also may be used in provisioning data processing systems with the network data processing system. Files needed for an installation may be located on the different nodes, these files are transferred to the target data processing system from the nodes. The files may then be installed on the target node.

Figure 4:
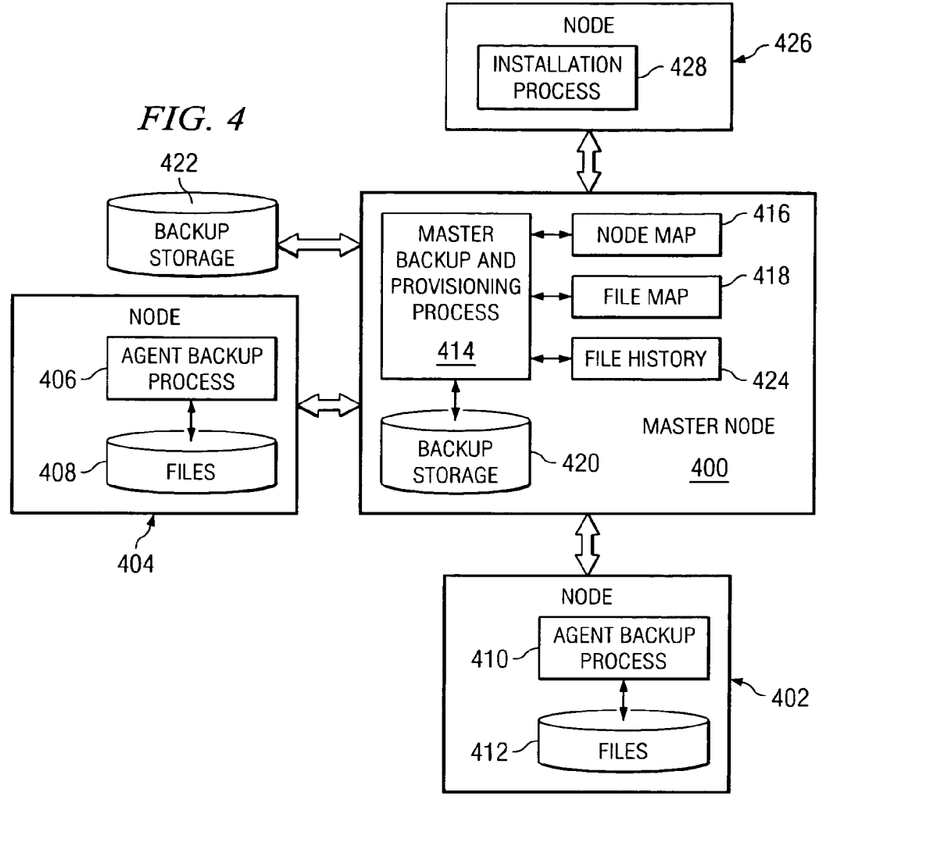
FIG. 4 is a diagram illustrating components used for backing up data, restoring data, and provisioning in accordance with a preferred embodiment of the present invention.

Turning next to FIG. 4, a diagram illustrating components used for backing up and restoring data, is depicted in accordance with a preferred embodiment of the present invention. In this example, master node 400 communicates with node 402 and node 404 to generate backup information as part of a backup process. These nodes are computers such as those found in network data processing system 100 in FIG. 1. Node 404 may be implemented using a computer, such as data processing system 300 in FIG. 3. Master node 400 may be implemented using a computer, such as data processing system 200 in FIG. 2.

In particular, agent backup process 406 identifies files 408 located on node 404. In a similar fashion, agent backup process 410 identifies files 412 located on node 402. This information is sent to master backup and provisioning process 414 on master node 400.

This information is used to generate node map 416. This map contains identification of nodes and the files on each node. Each entry is for a node on the network data processing system and identifies the files on that node. After information has been received from all the nodes, master backup and provisioning process 414 generates file map 418. Each entry in file map 418 is for a particular file identified in the nodes. The entry contains information identifying the location of each instance of the file. For example, the entry may contain the Internet Protocol (IP) address and path of the file for each node in which the file is found.

Additionally, master backup and provision process 414 analyzes file map 418 to identify any entries for file in which only a single node is present as part of this backup process. For each such entry, master backup and provisioning process 414 adds a storage location to the entry in the file map and copies the file to that storage location. In this illustrative example, the storage location is backup storage 420 in master node 400. As a result, these unique files in the network data processing system have a backup in backup storage 420. Further, any unique files found on master node 400 may be stored on a remote device, such as backup storage 422. In this manner, the mechanism of the present invention performs a backup of files on a network data processing system.

An incremental backup may be performed by receiving file information from nodes 402 and 404 and identifying a delta or change in files since the last scan of the nodes. New files that are identified are added to file map 418. For example, if a file is added to another node, this node is added to the entry for the file. If a file is removed from a node, the entry for the file is updated to reflect the removal of the file from the node. A history of these changes may be stored in file history 424.

If a file is missing or corrupted on a node, such as node 404, agent backup process 406 may communicate with master backup and provisioning process 414 to locate the file using file map 418. The file may be restored to node 404 from the location identified from file map 418. The file may be found on another node such as node 402 or on another backup storage device, such as backup storage 420 or backup storage 422.

Additionally, file map 418 may be used for other purposes. For example, the information on this map may be used in provisioning a new data processing system. In this example, master backup and provisioning process 414 may provision new nodes, such as node 426 using files located through file map 418. The located file may then be transferred or copied to node 426 and installed by installation process 428. In this manner, files for an installation may be found on different nodes, rather than requiring a central location. As a result, common files may be sent by nodes in the network data processing system to node 426. Unique files may be sent to node 426 from master node 400. Such a feature for provisioning is especially useful for a peer-to-peer network data processing system.

Figure 5:
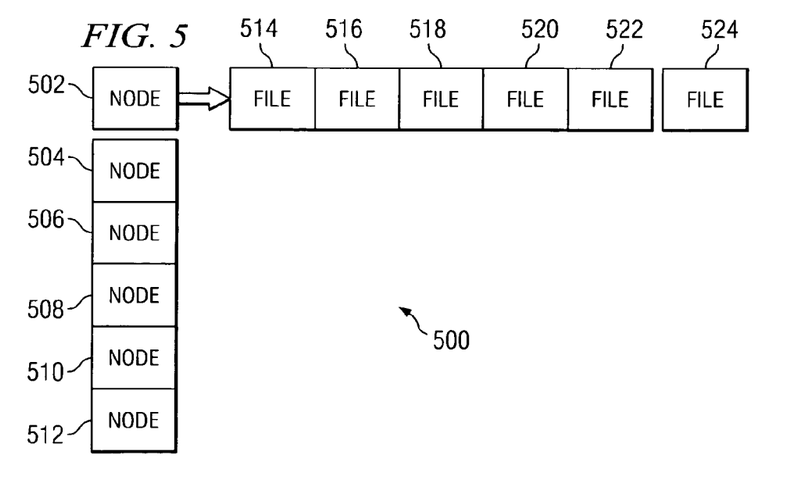
FIG. 5 is a node map in accordance with a preferred embodiment of the present invention.

Next in FIG. 5, a node map is depicted in accordance with a preferred embodiment of the present invention. Node map 500 is a more detailed example of node map 416 in FIG. 4. In this example, node map 500 contains entries 502, 504, 506, 508, 510, and 512. Each entry contains an identification of files located on a particular node. For example, node 502 contains files 514, 516, 518, 520, 522, and 524.

Figure 6:
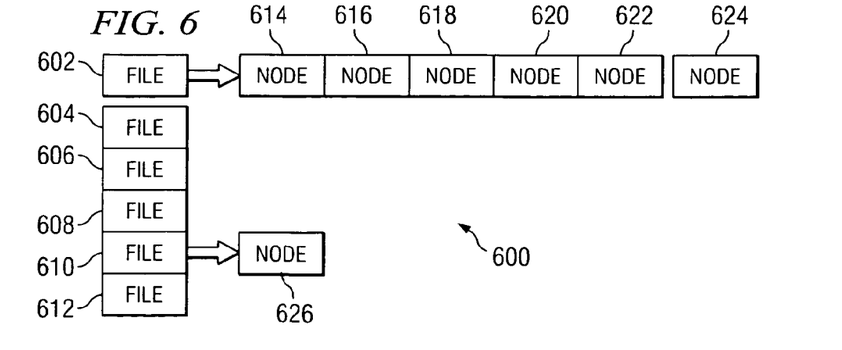
FIG. 6 is a diagram of a file map in accordance with a preferred embodiment of the present invention.

Turning next to FIG. 6, a diagram of a file map is depicted in accordance with a preferred embodiment of the present invention. File map 600 is a more detailed illustration of file map 418 in FIG. 4. File map 600 contains entries 602, 604, 606, 608, 610, and 612. Each entry contains an identification of nodes on which a file is found. For example, entry 602 identifies nodes 614, 616, 618, 620, 622, and 624 as being locations on which a file for entry 602 may be found.

In this example, entry 610 only has a single node as the location of the file. This file may be a unique file that is located on a central server. On the other hand, if the file is not a unique file on a central server, an additional backup of this file may be made on the central server or some other backup location as part of the backup process. The location for this backup may then be added to entry 610.

The entries in file map 600 are indexed by file. This index may take different forms depending on the particular implementation. For example, file nodes may be used for the indexes. To provide for more unique identifiers, a hash of the actual file itself may be used as the index. The file may be hashed using an algorithm, such as an MD5 hashing algorithm.

Further, file map 600 may also be employed in provisioning computers. Often times, all of the files needed for a particular computer or application may be found on a set of nodes on a network data processing system. File map 600 may be used to locate these files. The different nodes, on which the needed files are found, may send these files to the node on which provisioning is to occur. An installation program on the node may then install the files to provision the computer. The entire computer may be provisioned in this manner or a single application may be provisioned in these illustrative examples.

Figure 7A:
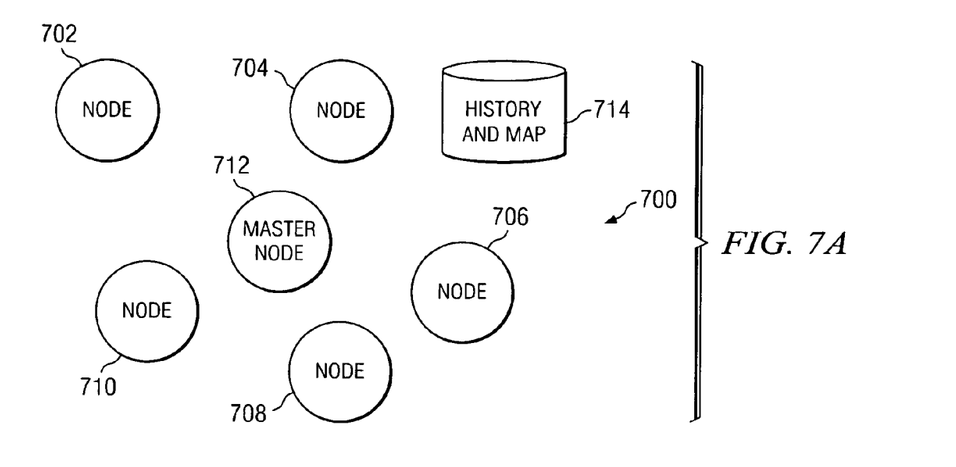
FIGS. 7A and 7B are diagrams of nodes in which files may be managed in accordance with a preferred embodiment of the present invention.
Figure 7B:
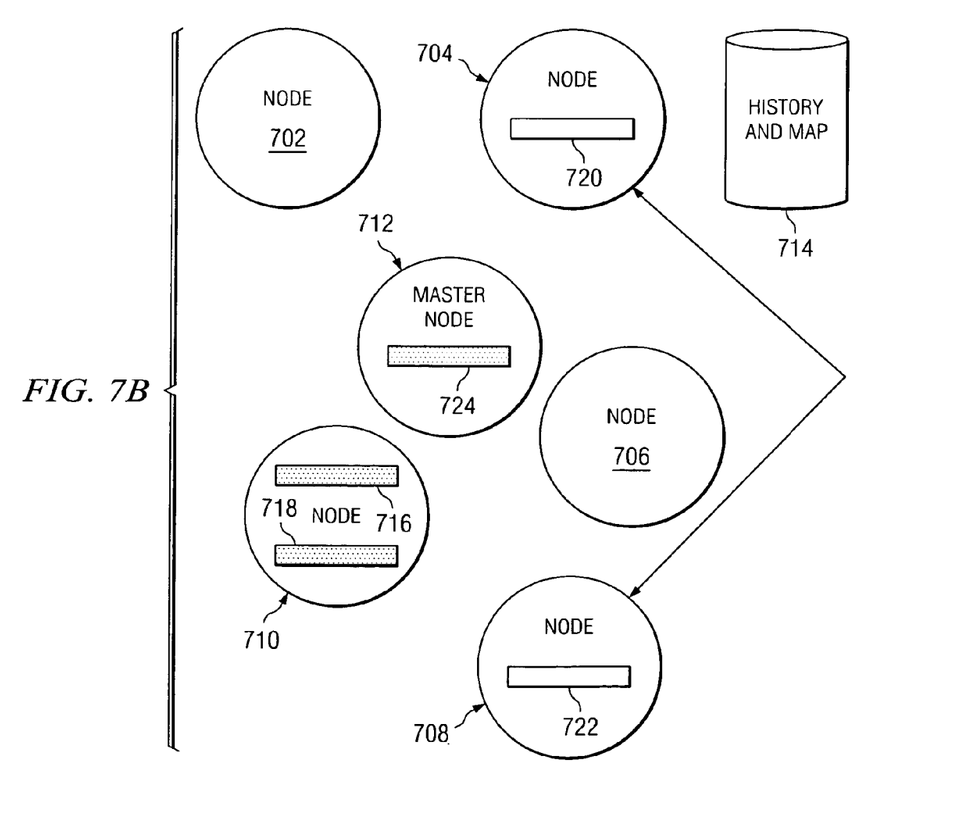

Turning next to FIGS. 7A and 7B, a diagram of nodes on which files may be managed is depicted in accordance with a preferred embodiment of the present invention. In this example, network data processing system 700 contains nodes 702, 704, 706, 708, and 710 in FIG. 7A. Master node 712 scans these nodes as part of a backup process. Based on the information received, a file map is generated in history and map 714.

In this example, node 710 contains failed files 716 and 718 in FIG. 7B. Replacement files for node 710 may be found in a file map located in history and map 714. In this example, node 704 contains file 720, which is a replacement for file 716. Node 708 contains file 722, which is a replacement for file 718. These files are transferred from nodes 708 and 710 in this example.

In a similar fashion, node 702 may be provisioned using files found on node 704, node 708, and master node 712. In this example, file 720, 722, and 724 are transferred to node 702 to provision this node for use in network data processing system 700. At that point, the installation program or utility may install the files and generate configuration information for node 702. Depending on the particular implementation, the configuration files may be included in files transferred or copied to node 702.

Figure 8:
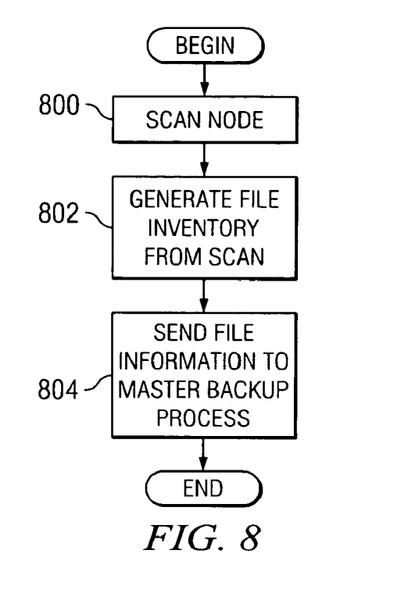
FIG. 8 is a flowchart of a process for sending file information to a master node in accordance with a preferred embodiment of the present invention.

Turning to FIG. 8, a flowchart of a process for sending file information to a master node is depicted in accordance with a preferred embodiment of the present invention. The process illustrated in FIG. 8 may be implemented in a process, such as agent backup process 406 in FIG. 4.

The process begins by scanning the node (step 800). Step 800 is used to identify the files located on the node. A file inventory is generated from the scan (step 802). File information is then sent to a master backup process (step 804) thus terminating the process. In this example, the master backup process is located on a remote node.

Figure 9:
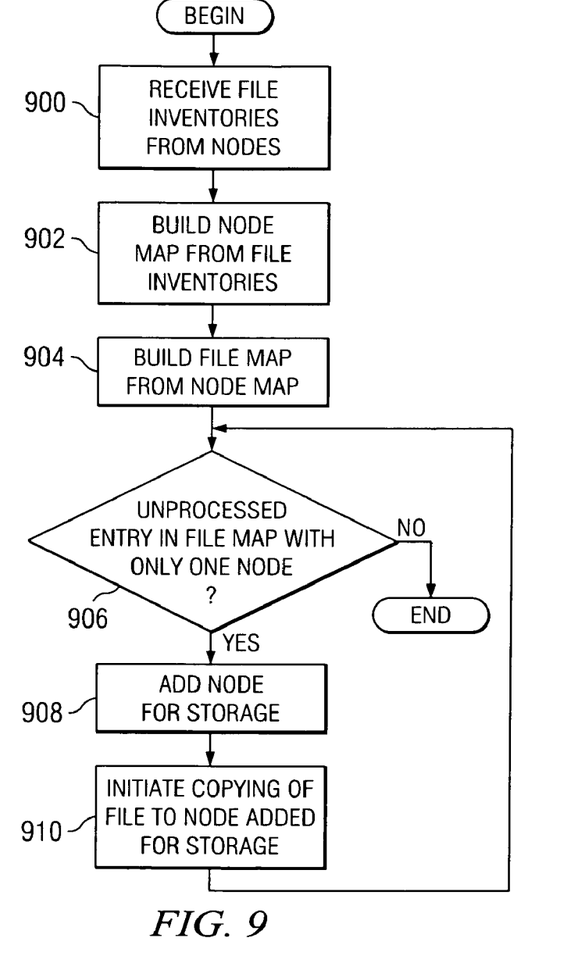
FIG. 9 is a flowchart of a process for backing up data in accordance with a preferred embodiment of the present invention.

With reference to FIG. 9, a flowchart of a process for backing up data is depicted in accordance with a preferred embodiment of the present invention. The process illustrated in FIG. 9 may be implemented on a node, such as master backup and provisioning process 414 on master node 400.

The process begins by receiving file inventories from nodes (step 900). A node map is built from the file inventories (step 912). This node map is similar to node map 500 in FIG. 5. A file map is built from a node map (step 904). In step 904, the file map is similar to file map 600 in FIG. 6.

Next, a determination is made as to whether an unprocessed entry in the file map with only one node is present (step 906). This step is used to identify nodes containing files that are not found on other nodes in the network data processing system. This step is not performed for central server unique files. This step is directed towards files that are generally found on nodes in the network data processing system. If only one node is present in the entry, the node is added for storage (step 908). The process initiates copying of a file to the node added for storage (step 910) with the process returning to step 906 to check for more unprocessed entries in a file map with only one node.

Turning back to step 906, if an unprocessed entry in a file map with only one node is not present, the process terminates.

Figure 10:
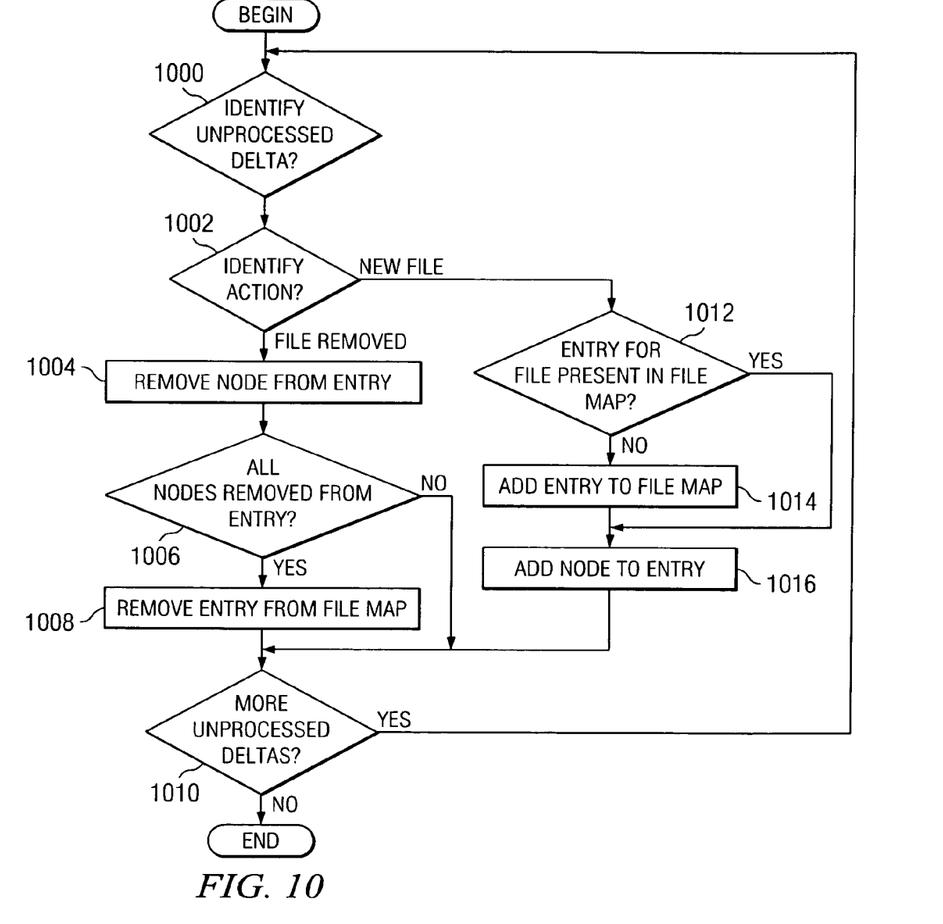
FIG. 10 is a flowchart of a process for performing an incremental backup in accordance with a preferred embodiment of the present invention.

Turning to FIG. 10, a flowchart of a process for performing an incremental backup is depicted in accordance with a preferred embodiment of the present invention. The process illustrated in FIG. 10 may be implemented on a node, such as master backup process 414 on master node 400. This process is initiated after the process illustrated in FIG. 9 in these example.

The process begins by identifying an unprocessed delta in the scan of nodes (step 1000). This step selects one change or delta from a set of changes in a scan of nodes for processing. A delta is a change in a file or a node in these examples. An action in the delta is identified (step 1002). If the action is a removal of a file, the node from which the file was removed is removed from the entry for the file in the file map (step 1004).

Next a determination is made as to whether all of the nodes have been removed from the entry for the file (step 1006). If all of the entries have been removed, the entry itself is removed from the file map (step 1008). Thereafter, a determination is made as to whether additional unprocessed deltas are present in the scan (step 1010). If additional deltas are not present the process terminates.

With reference again to step 1010, if additional unprocessed deltas are present, the process returns to step 1000 as described above. Turning back to step 1006, if all the nodes have not been removed from the entry, the process proceeds to step 1010.

With reference back to step 1002, if the action is the addition of a new file, a determination is made as to whether an entry for the file is present in the file map (step 1012). If an entry is not present in the file map for the new file, an entry is added to the file map for this new file (step 1014). The node is then added to the entry (step 1016). The process then proceeds to step 1010 as described above. Turning back to step 1002, if the entry is present in the file map, the process proceeds to step 1016 as previously described.

Figure 11:
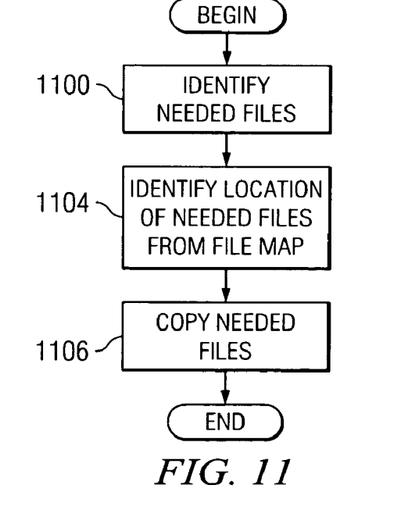
FIG. 11 is a flowchart of a process for provisioning a data processing system in accordance with a preferred embodiment of the present invention.

With reference next to FIG. 11, a flowchart of a process for provisioning a data processing system is depicted in accordance with a preferred embodiment of the present invention. The process illustrated in FIG. 11 may be implemented in a provisioning process, such as master backup and provisioning process 414 in FIG. 4.

The process beings by identifying files needed to provision a node (step 1100). These files may be all of the files needed by the node to function, such as the operating system and applications. In other example, the files may be for a single application or a set of applications that are to be installed on the node. The location of these files is identified using a file map (step 1104). The needed files are then copied to the node to be provisioned (step 1106) with the process terminating thereafter. When the files reach the node, an installation program on the node may them complete installation of the program. In some case, the installation program may be unnecessary if the appropriate files, including configuration, are copied to the appropriate file paths in the node. In these illustrative examples, some of the nodes involved in the backup or installation are peer nodes to others involved in the backup or installation.

Thus, the present invention provides an improved method, apparatus, and computer instructions for backing up and restoring data in a network data processing system. This mechanism also may be employed to install software on a computer to provision the computer for use in a network data processing system. The mechanism of the present invention employs a file map to identify the location of files for backing up and restoring data, as well as to provision computers.

This mechanism allows for distributed backup of data in a manner than avoids a need for costly storage systems, such as tape storage libraries and storage area network systems. This mechanism allows for a network data processing system to take advantage of files stored in multiple nodes in the network data processing system. Additionally, the use of this file map allows for the transfer or copying of files from distributed locations to a node for installation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in processing system for identifying and managing backup data on a set of nodes in a network data processing system, the method comprising:
    scanning of each node in the set of nodes, the each node in the set of nodes being a peer node to another node in the set of nodes;
    generating an inventory of files on all the nodes in the set of nodes;
    creating a node map from the inventory of files, the node map including an identification of the each node in the set of nodes and each file located on the each node;
    building a file map from the node map, wherein the file map identifies a set of files and identifies the each node on which a file in the set of files is located;
    determining from the file map if there is a unique file located only on a single node that is not on a central server;
    responsive to determining from the file map that there is a unique file located only on a single node that is not on a central server:
        adding a storage location to the unique file entry in the file map; and
        copying the unique file to the storage location; and
    responsive to determining from the file map that there is a unique file located only on a single node that is on a central server, storing the unique file on a remote device such as backup storage server.

2. The method of claim 1,
    wherein the storage location is backup storage in a master node in the set of nodes.

3. The method of claim 1 further comprising:
    performing a scan on the set of nodes to identify a change in files or nodes;
    responsive to the scan identifying that one or more new files have been added to a particular node in the set of nodes, adding an entry for the one or more new files to the file map and adding the particular node to the entry;
    responsive to the scan identifying that one or more existing files have been added to a particular node in the set of nodes, adding the particular node to an entry for the one or more existing files in the file map; and
    responsive to the scan identifying that one or more old files have been removed from a particular node in the set of nodes, removing the particular node from the entry of the one or more old files in the file map; and
    responsive to the scan identifying that all nodes for an entry of a particular file in the file map have been removed, removing the entry of the particular file from the file map.

4. The method of claim 1, further comprising:
    provisioning a set of files identified by the file map as located on different nodes in the set of nodes to a particular node in the set of nodes by:
        using the file map to locate the set of files;
        sending any unique files in the set of files from a master node to the particular node;
        sending common files from the different nodes to the particular node; and
        installing the set of files.

5. The method of claim 3 further comprising:
    responsive to the scan identifying one or more missing or corrupted files in a particular node in the set of nodes, restoring the one or more missing or corrupted files to the particular node by:
        using the file map to identify another location in the set of nodes containing the one or more missing or corrupted file; and
        copying the identified files from the identified another location to the particular node.

6. The method of claim 4, wherein the set of files is for an application on the a data processing system.

7. The method of claim 1, wherein the set of files are files used in a new data processing system.

8. A data processing system in a processing system for identifying and managing backup data on a set of nodes in a network data processing system, the data processing system comprising:
    scanning means for scanning of each node in the set of nodes, the each node in the set of nodes being a peer node to another node in the set of nodes;
    generating means for generating an inventory of files on all the nodes in the set of nodes;
    creating means for creating a node map from the inventory of files, the node map including an identification of the each node in the set of nodes and each file located on the each node;
    building means for building a file map from the node map, wherein the file map identifies a set of files and identifies the each node on which a file in the set of files is located;
    determining means for determining from the file map if there is a unique file located only on a single node that is not on a central server;
    responsive to determining from the file map that there is a unique file located only on a single node that is not on a central server;
        adding a storage location to the unique file entry in the file map; and
        copying the unique file to the storage location; and
    responsive to determining from the file map that there is a unique file located only on a single node that is on a central server, storing the unique file on a remote device such as backup storage server.

9. The data processing system of claim 8 wherein the storage location is backup storage in a master node in the set of nodes.

10. The data processing system of claim 8 further comprising:
    performing means for performing a scan on the set of nodes to identify a change in files or nodes;
    adding means, responsive to the scan identifying that one or more new files have been added to a particular node in the set of nodes, for adding an entry for the one or more new files to the file map and adding the particular node to the entry;
    adding means, responsive to the scan identifying that one or more existing files have been added to a particular node in the set of nodes, for adding the particular node to an entry for the one or more existing files in the file map; and
    removing means, responsive to the scan identifying that one or more old files have been removed from a particular node in the set of nodes, for removing the particular node from the entry of the one or more old files in the file map; and
    removing means, responsive to the scan identifying that all nodes for an entry of a particular file in the file map have been removed, for removing the entry of the particular file from the file map.

11. The data processing system of claim 8, further comprising:
    provisioning means for provisioning a set of files identified by the file map as located on different nodes in the set of nodes to a particular node in the set of nodes by:

using the file map to locate the set of files;

sending any unique files in the set of files from a master node to the particular node;

sending common files from the different nodes to the particular node; and installing the set of files.

12. The data processing system of claim 10 further comprising:

restoring means, responsive to, scan identifying one or more missing or corrupted files in a particular node in the set of nodes, for restoring the one or more missing or corrupted files to the particular node by:

using the file map to identify another location in the set of nodes containing the one or more missing or corrupted file; and copying means for copying the identified files from the identified another location to the particular node.

13. The data processing system of claim 11, wherein the set of files is for an application on the data processing system.

14. The data processing system of claim 8, wherein the set of files are files used in a new data processing system.

15. A computer readable medium of instructions in a processing system for identifying and managing backup data on a set of nodes in a network data processing system, the computer readable medium of instructions comprising:

first instructions scanning of each node in the set of nodes, the each node in the set of nodes being a peer node to another node in the set of nodes;

second instructions for generating an inventory of files on all the nodes in the set of nodes;

third instructions for creating a node map from the inventory of files, the node map including an identification of the each node in the set of nodes and each file located on the each node;

fourth instructions for building a file map from the node map, wherein the file map identifies a set of files and identifies the each node on which a file in the set of files is located;

fifth instructions for determining from the file map if there is a unique file located only on a single node that is not on a central server;

sixth instructions for responsive to determining from the file map that there is a unique file located only on a single node that is not on a central server;

adding a storage location to the unique file entry in the file map; and copying the unique file to the storage location; and seventh instructions for responsive to determining from the file map that there is a unique file located only on a single node that is on a central server, storing the unique file on a remote device such as backup storage server.

16. The computer readable medium of instructions of claim 15 wherein the storage location is backup storage in a master node in the set of nodes.

17. The computer readable medium of instructions of claim 15 further comprising:

eighth instructions for performing a scan on the set of nodes to identify a change in files or nodes;

nine instructions for responsive to the scan identifying that one or more new files have been added to a particular node in the set of nodes, adding an entry for the one or more new files to the file map and adding the particular node to the entry;

tenth instructions for responsive to the scan identifying that one or more existing files have been added to a particular node in the set of nodes, adding the particular node to an entry for the one or more existing files in the file map; and eleventh instructions for responsive to the scan identifying that one or more old files have been removed from a particular node in the set of nodes, removing the particular node from the entry of the one or more old files in the file map; and twelfth instructions for responsive to the scan identifying that all nodes for an entry of a particular file in the file map have been removed, removing the entry of the particular file from the file map.

18. The computer readable medium of instructions of claim 15, further comprising:

eighth instructions for provisioning a set of files identified by the file map as located on different nodes in the set of nodes to a particular node in the set of nodes by:

using the file map to locate the set of files;

sending any unique files in the set of files from a master node to the particular node;

sending common files from the different nodes to the particular node; and installing the set of files.

19. The computer readable medium of instructions of claim 17 further comprising:

thirteenth instructions for responsive to the scan identifying one or more missing or corrupted files in a particular node in the set of nodes, restoring the one or more missing or corrupted files to the particular node by:

using the file map to identify another location in the set of nodes containing the one or more missing or corrupted file; and copying the identified files from the identified another location to the particular node.

20. The computer readable medium of instructions of claim 18, wherein the set of files is for an application on the data processing system.

21. The computer readable medium of instructions of claim 15, wherein the set of files are files used in a new data processing system.

22. A data processing system comprising:

a bus;

a communications unit connected to the bus;

a memory connected to the bus, wherein the memory includes a set of instructions; and a processor unit connected to the bus, wherein the processor unit executes the set of instructions to scan of each node in the set of nodes, the each node in the set of nodes being a peer node to another node in the set of nodes; generate an inventory of files on all the nodes in the set of nodes; create a node map from the inventory of files, the node map including an identification of the each node in the set of nodes and each file located on the each node;

build a file map from the node map, wherein the file map identifies a set of files and identifies the each node on which a file in the set of files is located, determine from the file map if there is a unique file located only on a single node that is not on a central server; responsive to determining from the file map that there is a unique file located only on a single node that is not on a central server; add a storage location to the unique file entry in the file map; and copy the unique file to the storage location; and responsive to determining from the file map that there is a unique file located only on a single node that is on a central server, store the unique files on a remote device such as backup storage server.

* * * * *

UNITED STATES PATENT AND TRADEMARK OFFICE
CERTIFICATE OF CORRECTION

PATENT NO. : 7,586,839 B2  Page 1 of 1
APPLICATION NO. : 11/014563
DATED : September 8, 2009
INVENTOR(S) : Childress et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1299 days.

Signed and Sealed this

Twenty-first Day of September, 2010

David J. Kappos
*Director of the United States Patent and Trademark Office*